(12) United States Patent
Ishibashi et al.

(10) Patent No.: US 8,635,667 B2
(45) Date of Patent: Jan. 21, 2014

(54) ELECTRONIC APPARATUS AND TERMINAL

(75) Inventors: Takanobu Ishibashi, Yokohama (JP); Kiyoshi Toshimitsu, Tokyo (JP); Masataka Goto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 13/038,819

(22) Filed: Mar. 2, 2011

(65) Prior Publication Data

US 2011/0219428 A1 Sep. 8, 2011

(30) Foreign Application Priority Data

Mar. 3, 2010 (JP) ................................. 2010-046981

(51) Int. Cl.
G06F 21/00 (2013.01)

(52) U.S. Cl.
USPC ............... 726/3; 713/176; 713/182; 370/328; 370/331; 455/41; 455/411; 726/4; 726/5

(58) Field of Classification Search
USPC .......................................................... 726/3
See application file for complete search history.

(56) References Cited

U.S. PATENT DOCUMENTS

| | | | | |
|---|---|---|---|---|
| 5,598,459 | A * | 1/1997 | Haartsen ........................ | 455/411 |
| 7,415,102 | B2 | 8/2008 | Iggulden et al. | |
| 7,702,333 | B2 * | 4/2010 | Walker et al. .................. | 455/434 |
| 7,761,085 | B2 * | 7/2010 | Johur ............................. | 455/411 |
| 8,203,996 | B2 * | 6/2012 | Masuda ......................... | 370/328 |
| 2004/0203384 | A1 * | 10/2004 | Sugikawa et al. ............. | 455/41.2 |
| 2005/0152305 | A1 | 7/2005 | Ji et al. | |
| 2005/0154895 | A1 | 7/2005 | Zhang | |
| 2005/0191992 | A1 * | 9/2005 | Inoue et al. .................... | 455/411 |
| 2006/0034238 | A1 * | 2/2006 | Inoue et al. .................... | 370/338 |
| 2006/0236377 | A1 | 10/2006 | Metke et al. | |
| 2007/0206537 | A1 | 9/2007 | Cam-Winget et al. | |
| 2008/0083022 | A1 * | 4/2008 | Lee et al. ........................... | 726/5 |
| 2008/0102795 | A1 * | 5/2008 | Johur ............................. | 455/411 |
| 2009/0217048 | A1 * | 8/2009 | Smith ............................. | 713/176 |
| 2013/0047218 | A1 * | 2/2013 | Smith ................................ | 726/4 |

FOREIGN PATENT DOCUMENTS

| | | |
|---|---|---|
| EP | 1 657 943 A1 | 5/2006 |
| EP | 1 906 619 | 4/2008 |
| GB | 2 421 874 A | 7/2006 |
| JP | 2004-355396 | 12/2004 |
| JP | 2008-028892 | 2/2008 |
| JP | 2008-131726 | 6/2008 |
| WO | WO 2007/071009 | 6/2007 |
| WO | WO 2008/098611 | 8/2008 |

OTHER PUBLICATIONS

A new remote user authentication scheme using smart cards|http://120.108.115.54/www/myjournal/P013.pdf|Hwang et al.|2000|pp. 1-3.*

(Continued)

Primary Examiner — Mahfuzur Rahman
(74) Attorney, Agent, or Firm — Pillsbury Winthrop Shaw Pittman, LLP

(57) ABSTRACT

According to one embodiment, an electronic device connected to an authentication device through a first communication network, and further connected to another electronic device through a second communication network, wherein the electronic device executes authentication of the electronic device and another electronic device by data delivery/receipt conforming to a predetermined procedure between the electronic device and the authentication device through the first communication network, and data delivery/receipt between the electronic device and another electronic device through the second communication network.

10 Claims, 7 Drawing Sheets

(56) References Cited

OTHER PUBLICATIONS

European Search Report dated Jun. 24, 2011.
Singapore Search Report dated Dec. 21, 2011.
Japanese Office Action dated Apr. 10, 2012 for Appln. No. 2010-046981.
Derenale et al.; "An EAP-SIM Based Authentication Mechanism to Open Access Networks", Telektronikk, Mar. 4, 2006, pp. 135-144; http://www.telektronikk.com/volumes/pdf/3_4.2006/Page_135-144.pdf.
"N-60A: We Want to Know "This", Series 5, "Easy to Use Access Point Mode?—"N-06A" [on line], Aug. 6, 2009, [retrieved on Mar. 28, 2012]. Retrieved via the Internet, URL, <http://plusd.itmedia.co.jp/mobile/articles/0908/06/news087.html>.
Shiro Sakata, "Extensible Authentication Protocol (EAP) for Mobile Telephone and the Authentication Method," Greatest Problem to Completely IP System, EAP and Authentication Method [online], May 30, 2006, [retrieved on Mar. 28, 2011], the Internet, URL, <http://www.atmarkit.co.jp/club/print/print.php>.
Katsutoshi Nidaira, Masayoshi Nakayama, Hirohito Suda, "A Study on Authentication Scheme for Wireless Multi-Hop Networks", Proceedings 2002, The Institute of Electronics Information and Communication Engineers, Japan, The Institute of Electronics Information and Communication Engineers, Mar. 7, 2002, Communication No. 2, B-7-4, p. 231.

\* cited by examiner

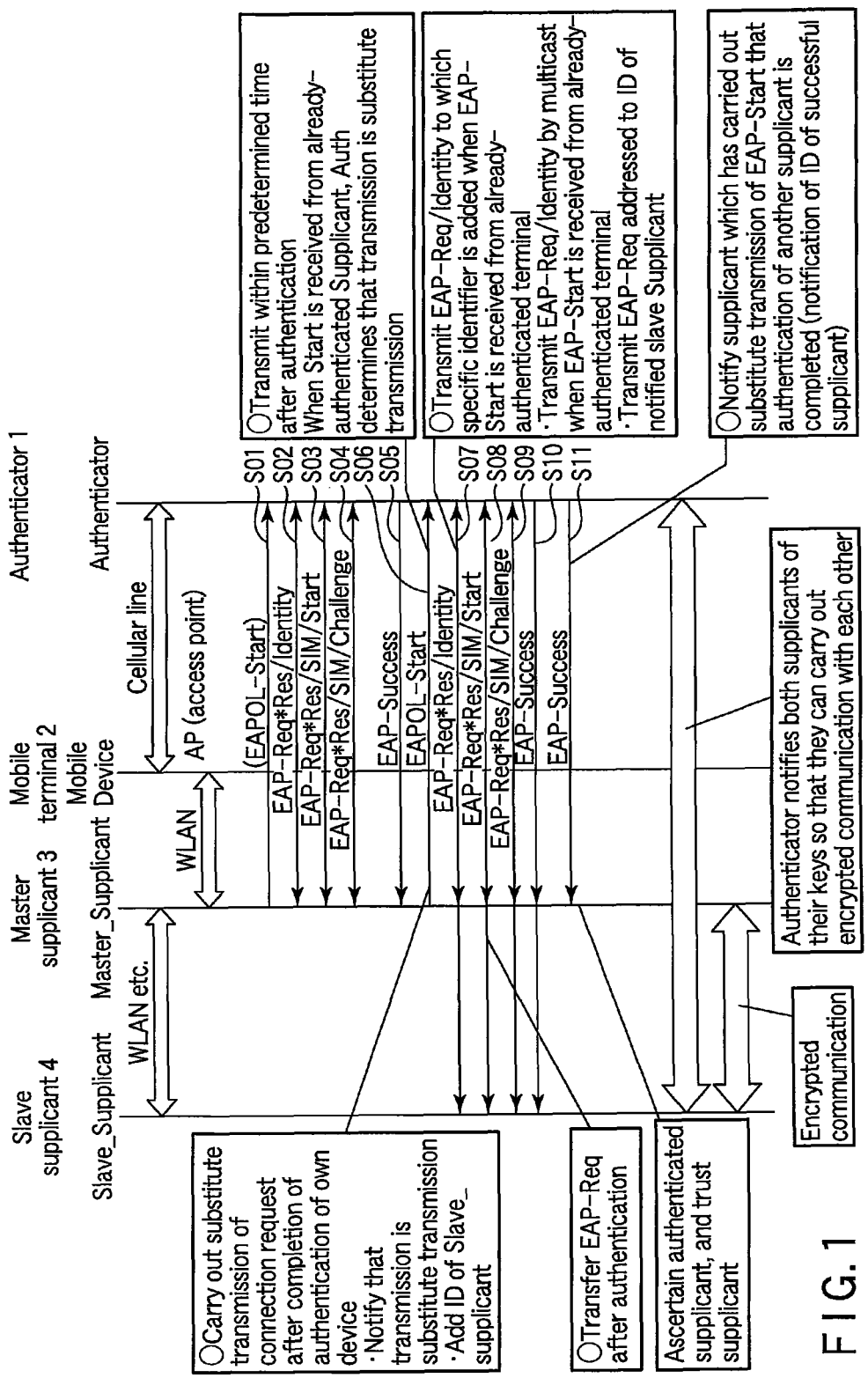
F I G. 1

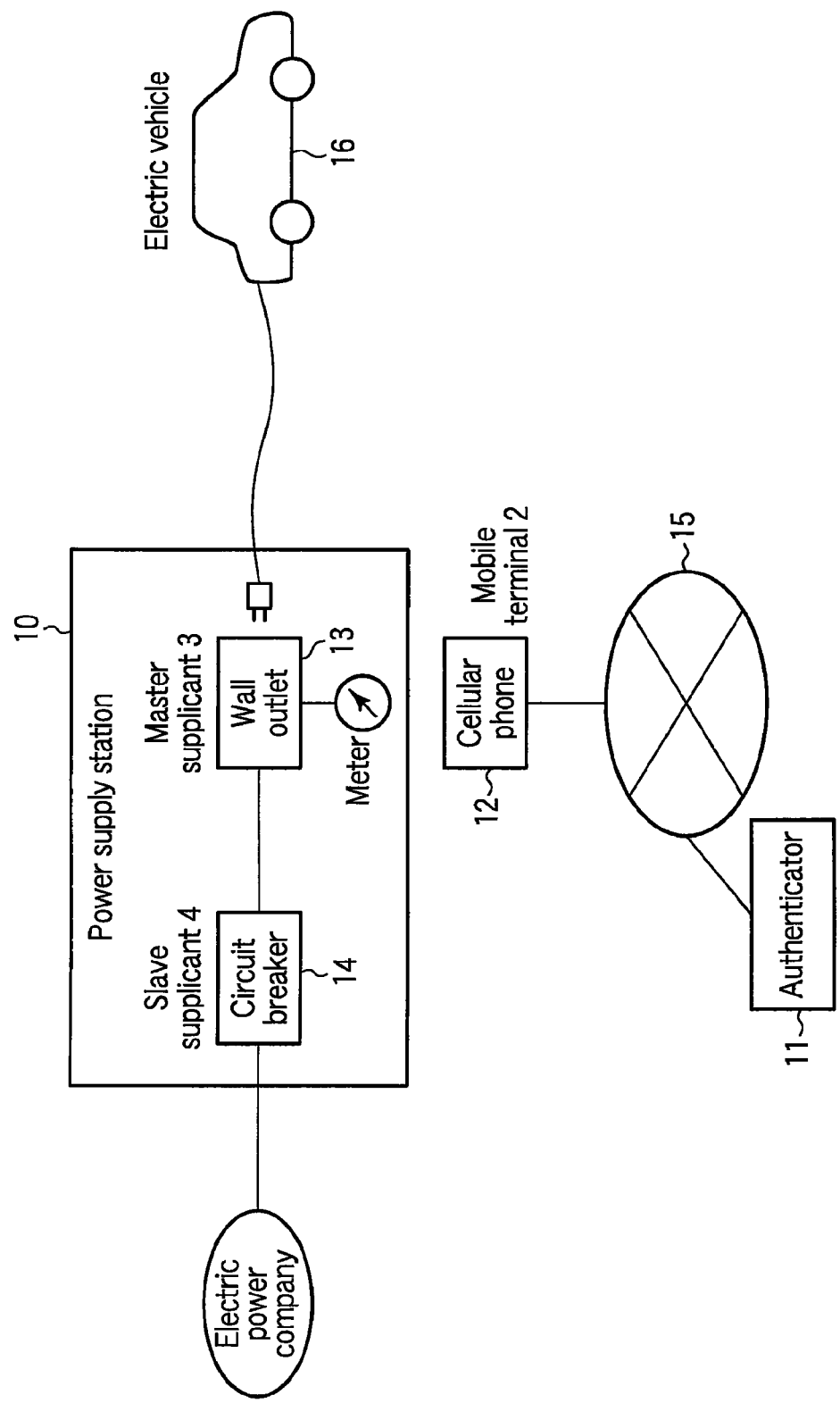
F I G. 5

ELECTRONIC APPARATUS AND TERMINAL

CROSS-REFERENCE TO RELATED APPLICATIONS

This application is based upon and claims the benefit of priority from Japanese Patent Application No. 2010-046981, filed Mar. 3, 2010; the entire contents of which are incorporated herein by reference.

FIELD

Embodiments described herein relate generally to an authentication technique capable of authenticating a plurality of devices by cooperation of the devices.

BACKGROUND

The Global System for Mobile Communications (GSM) is a wireless communication system used for digital cellular telephony. As means having a function of carrying out authentication of a user on the GSM network, and effective accounting management, a Subscriber Identity Module (SIM) is known. As a technique for utilizing the authentication function of the SIM for wireless LAN service, there is an Extensible Authentication Protocol Method for GSM Subscriber Identity Module (EAP-SIM). It should be noted that EAP is a protocol obtained by extending the mechanism of Point-to-Point Protocol (PPP) used in the Internet, and intended for wireless LAN.

Incidentally, in the EAP-SIM, although a protocol is defined between a supplicant corresponding to a data device, and authenticator corresponding to certification authority, this is a protocol corresponding to a configuration having one supplicant and one authenticator.

Accordingly, when a plurality of supplicants are present, although the authenticator needs to execute the aforementioned authentication operation for each of the supplicants, then each of the plurality of supplicants has to carry out an authentication operation together with the authenticator at independent timing, and it is difficult to assure an effective authentication operation due to, for example, signal conflict, repetition of a duplicate operation, and the like.

BRIEF DESCRIPTION OF THE DRAWINGS

FIG. 1 is an exemplary signal delivery/receipt chart showing a procedure in which two supplicants cooperate with each other to execute an authentication operation together with an authenticator according to an embodiment.

FIG. 5 is an exemplary view for explaining an example in which the authentication system is applied to power supply service for an electric vehicle according to the embodiment.

DETAILED DESCRIPTION

Figure 2:
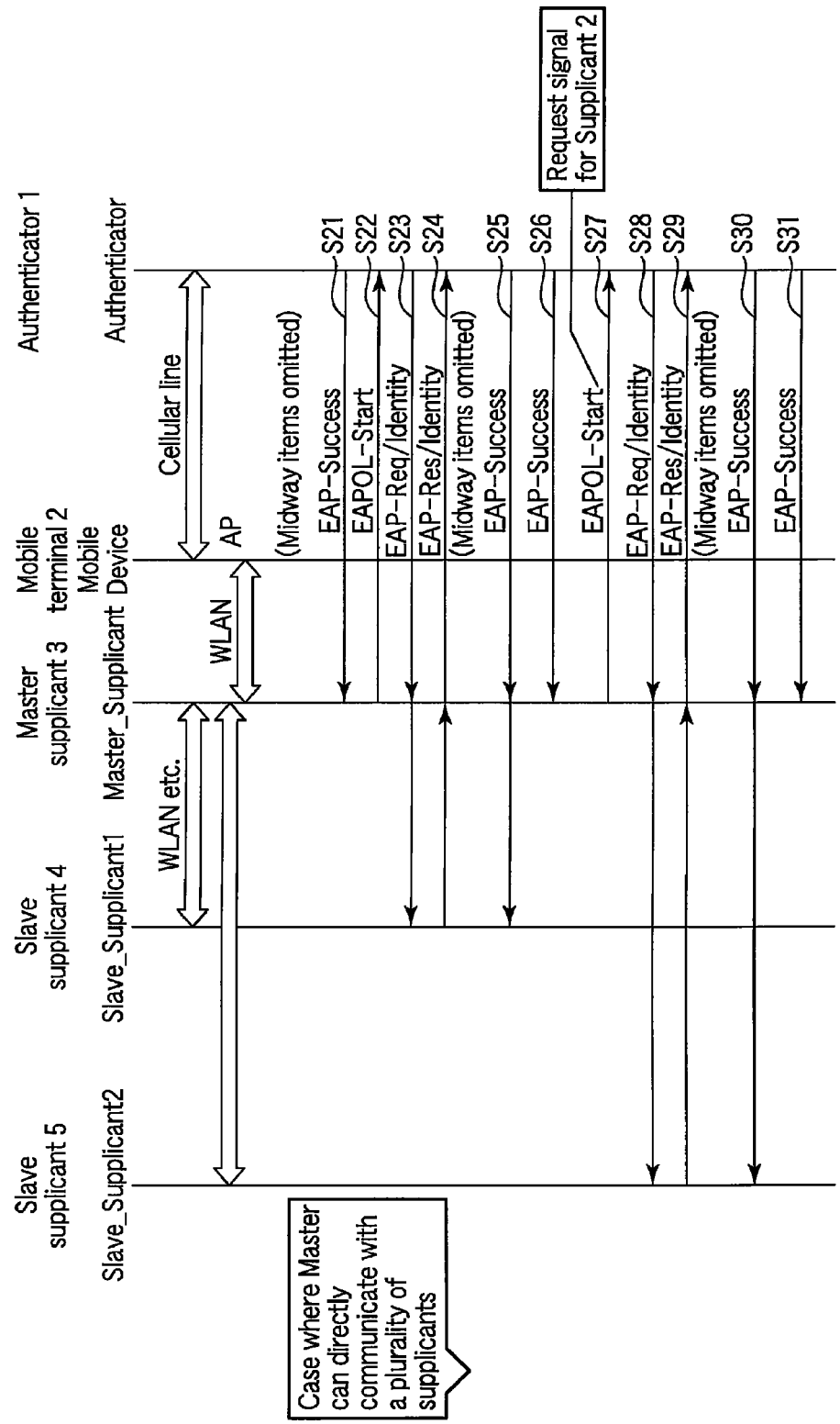
FIG. 2 is an exemplary signal delivery/receipt chart showing a procedure in which three supplicants cooperate with each other to execute an authentication operation together with an authenticator according to the embodiment.

In general, according to one embodiment, an electronic device connected to an authentication device through a first communication network, and further connected to another electronic device through a second communication network executes authentication of the electronic device and another electronic device by data delivery/receipt conforming to a predetermined procedure between the electronic device and the authentication device through the first communication network, and data delivery/receipt between the electronic device and another electronic device through the second communication network.

First Embodiment

Hereinafter, this embodiment will be described below in detail with reference to the drawings.

FIG. 1 is an exemplary signal delivery/receipt chart showing a procedure in which two supplicants of this embodiment cooperate with each other to execute an authentication operation together with an authenticator.

In the procedure shown in FIG. 1, an authenticator 1, mobile terminal 2, master supplicant 3, and slave supplicant 4 execute signal delivery/receipt.

The authenticator 1 and mobile terminal 2 can communicate with each other through a GSM (for example, a cellular line). However, the communication system between the authenticator 1 and mobile terminal 2 is not limited to GSM. Further, the mobile terminal 2 has a communication function different from the cellular line, for example, a wireless communication function of a short distance, wireless LAN (WLAN) function or the like, and can also function as an access point (AP).

The master and slave supplicants 3 and 4 each have a SIM function, and function of a wireless LAN slave unit. The master supplicant 3 and slave supplicant 4 can communicate with each other through the wireless LAN. However, the communication system of the master supplicant 3 and slave supplicant 4 is not limited to the wireless LAN, and it is sufficient if the supplicants 3 and 4 can be connected to each other by any communication system. Accordingly, the master and slave supplicants 3 and 4 can be ascertained as communication devices each of which is provided with a securing function.

Next, a procedure for signal delivery/receipt for authentication will be described below. It should be noted that the signal delivery/receipt procedure will be described in conformity with the specification of IEEE 802.1X to correspond to the two roles of the "supplicant" and "authenticator".

When the mobile terminal 2 and master supplicant 3 are connected to each other through a wireless LAN in a state where the mobile terminal 2 can communicate with the authenticator 1, the master supplicant 3 transmits an EAPOL-Start signal in step S01 to the authenticator 1 through the mobile terminal 2 in accordance with the EAP-SIM authentication procedure.

It should be noted that the mobile terminal 2 bears a function of transferring a signal to/from the master supplicant 3 from/to the authenticator 1 which are different from each other in communication system. Accordingly, in the procedure after this, the operation of the mobile terminal 2 will not be mentioned, and a description will be given on the assumption that the authenticator 1 and each of the master and slave supplicants 3 and 4 directly carry out signal delivery/receipt.

In step S02, the authenticator 1 which has received an EAPOL-Start signal transmits an EAP-Request/Identity signal to the master supplicant 3, and master supplicant 3 which has received the signal transmits an EAP-Response/Identity signal.

In step S03, the authenticator 1 which has received the EAP-Response/Identity signal starts authentication processing, and transmits an EAP-Request/SIM/Start signal to the master supplicant 3. Further, an EAP-Response/SIM/Start signal which is a response signal to the EAP-Request/SIM/Start signal is received from the master supplicant 3.

In step S04, the authenticator 1 transmits an EAP-Request/SIM/Challenge signal to the supplicant 3 in order to carry out authentication for determining whether or not the master supplicant 3 is a valid device. The master supplicant 3 transmits an EAP-Response/SIM/Challenge signal which is a response signal thereto to the authenticator 1.

The authenticator 1 can determine whether or not the master supplicant 3 is a valid device by analyzing the response signal. For example, it is determined whether or not the supplicant 3 is a valid device by analyzing a decryption code included in the response signal of the master supplicant 3.

When the authenticator 1 can correctly carry out authentication, an EAP-Success signal is transmitted to the master supplicant 3 in step S05. Having received this signal, the master supplicant 3 recognizes that its own device has correctly been authenticated.

Subsequently, an authentication procedure for the slave supplicant 4 will be described below.

When the master supplicant 3 determines that authentication of the slave supplicant 4 has not been carried out yet, the supplicant 3 transmits, in step S06, an EAPOL-Start signal for requesting the authenticator 1 to start authentication processing again within a predetermined time after completion of authentication of its own device to the authenticator 1.

An identifier indicating that the master supplicant transmits the EAPOL-Start signal on behalf of the slave supplicant may be added to the EAPOL-Start signal, or when the master supplicant ascertains an identifier ID of the slave supplicant, the master supplicant may add the identifier ID of the slave supplicant to the EAPOL-Start signal to thereby transmit the signal.

The authenticator 1 which has received the EAPOL-Start signal carries out the following determination.

The EAPOL-Start signal has been received from the same supplicant which has already been authenticated within a predetermined time after the authentication processing of the master supplicant 3, and hence the authenticator 1 determines that the EAPOL-Start signal has been transmitted thereto from the master supplicant on behalf of the slave supplicant.

Alternatively, when an identifier indicating that the signal has been transmitted on behalf of the slave supplicant as described above or an identifier ID (identifier ID of the slave supplicant 4) different from that of the master supplicant 3 is added to the EAPOL-Start signal, the authenticator 1 utilizes the added data to determine that the EAP-Start signal has been transmitted thereto from the master supplicant 3 on behalf of the slave supplicant 4.

Further, when the authenticator 1 has determined that the signal is an EAPOL-Start signal transmitted thereto on behalf of the slave supplicant 4 by any one of the above methods, the authenticator 1 transmits, in step S07, an EAP-Request/Identity signal to which a specific identifier is added.

The specific identifier may be shown by setting a certain specific bit or the specific identifier can be made by making the destination address of the EAP-Request/Identity signal to be transmitted a multicast address or a broadcast address.

Further, when the identifier ID of the slave supplicant 4 is added to the received EAPOL-Start signal, an EAP-Request/Identity signal a destination address of which is made the identifier ID of the slave supplicant 4 may be transmitted.

The master supplicant 3 receives the EAP-Request/Identity signal transmitted from the authenticator 1. When the received EAP-Request/Identity signal corresponds to any one of the following cases, the master supplicant 3 determines that the signal is not addressed to its own device.

(1) A specific identifier is added to the signal. (2) The destination address is not for its own device. (3) After the authentication of its own device has been completed, the fact that an EAPOL-Start signal has been transmitted on behalf of the slave supplicant is retained, and an EAP-Request/Identity signal is received within a predetermined time.

Further, the master supplicant 3 transfers the EAP-Request/Identity signal to the slave supplicant 4. The slave supplicant 4 which has received this signal transmits an EAP-Response/Identity signal to the authenticator 1.

In steps S08 to S09, the authenticator 1 carries out authentication processing of the slave supplicant 4 through the EAP-Request•Response/SIM/Start processing, and EAP-Request•Response/SIM/Challenge processing in the same manner as described above. Further, when the authentication has been carried out correctly, the authenticator 1 transmits, in step S10, an EAP-Success signal to the master supplicant 3 to notify the supplicant 3 of the completion of the authentication of the slave supplicant 4. The master supplicant 3 transfers the EAP-Success signal to the slave supplicant 4.

In step S11, the authenticator 1 transmits an EAP-Success signal to the master supplicant 3 which has transmitted the EAPOL-Start signal thereto on behalf of the slave supplicant to notify the supplicant 3 of the completion of the authentication of the other supplicant. The authenticator 1 notifies the master supplicant 3 of completion of the authentication by adding, for example, the ID of the supplicant authentication of which has been successfully completed to the signal. Hereby, it is possible for the master supplicant 3 to ascertain the authenticated supplicant, and determine that the supplicant is an authenticated valid device.

Further, it is possible for the authenticator 1 to notify the master supplicant 3 of an encryption key used for the encrypted communication between the authenticator 1 and slave supplicant 4, and also notify the slave supplicant 4 of an encryption key used for the encrypted communication between the authenticator 1 and master supplicant 3. Hereby, it also becomes possible for the master supplicant 3 and slave supplicant 4 to carry out encrypted communication with each other.

[Variation 1 of First Embodiment]

FIG. 2 is an exemplary signal delivery/receipt chart showing a procedure in which three supplicants of the embodiment cooperate with each other to execute an authentication operation together with an authenticator. It should be noted that parts identical to the first embodiment are denoted by reference symbols identical to the first embodiment, and a detailed description of them are omitted.

In the procedure shown in FIG. 2, an authenticator 1, mobile terminal 2, master supplicant 3, slave supplicant 4, and slave supplicant 5 execute signal delivery/receipt. Further, the master supplicant 3 can directly communicate with slave supplicants 4 and 5.

The master supplicant 3 carries out its own authentication operation between itself and the authenticator 1. This procedure is identical to steps S01 to S04 of the procedure shown in FIG. 1, and hence a description thereof is omitted.

When authentication has been carried out correctly, the authenticator 1 transmits, in step S21, an EAP-Success signal to the master supplicant 3. The master supplicant 3 which has received this signal recognizes that its own device has been correctly authenticated.

Subsequently, an authentication procedure of slave supplicant 4 shown below is executed.

When the master supplicant 3 determines that authentication of slave supplicant 4 has not been carried out yet, the supplicant 3 transmits, in step S22, an EAPOL-Start signal for requesting the authenticator 1 to start authentication processing again within a predetermined time after completion of authentication of its own device to the authenticator 1.

When the authenticator 1 which has received this signal determines that this signal is the EAPOL-Start signal transmitted thereto on behalf of slave supplicant 4, the authenticator 1 transmits an EAP-Request/Identity signal to the master supplicant 3 in step S23. The master supplicant 3 receives the EAP-Request/Identity signal transmitted from the authenticator 1. The master supplicant 3 transfers the EAP-Request/Identity signal to slave supplicant 4.

In step S24, slave supplicant 4 which has received this signal transmits an EAP-Response/Identity signal to the master supplicant 3. The master supplicant 3 transfers the received EAP-Response/Identity signal to the authenticator 1. Subsequently, the authenticator 1 carries out authentication processing of slave supplicant 4 through the EAP-Request•Request/SIM/Start processing, and EAP-Request•Response/SIM/Challenge processing. This procedure is identical to that described above, and hence a description thereof is omitted.

When authentication has been carried out correctly, the authenticator 1 transmits an EAP-Success signal to slave supplicant 4 in step S25. Further, in step S26, the authenticator 1 transmits an EAP-Success signal to the master supplicant 3 which has transmitted the EAPOL-Start signal thereto on behalf of slave supplicant 4 to notify the master supplicant 3 of the completion of the authentication of slave supplicant 4.

Subsequently, an authentication procedure of slave supplicant 5 will be described below.

When the master supplicant 3 determines that authentication of slave supplicant 5 has not been carried out yet, the supplicant 3 transmits, in step S27, an EAPOL-Start signal for requesting the authenticator 1 to start authentication processing again within a predetermined time after the completion of the authentication of slave supplicant 4 to the authenticator 1.

When the authenticator 1 which has received this signal determines that this signal is the EAPOL-Start signal transmitted thereto on behalf of slave supplicant 5, the authenticator 1 transmits an EAP-Request/Identity signal to the master supplicant 3 in step S28. The master supplicant 3 receives the EAP-Request/Identity signal transmitted from the authenticator 1. The master supplicant 3 transfers the EAP-Request/Identity signal to slave supplicant 5.

In step S29, slave supplicant 5 which has received this signal transmits an EAP-Response/Identity signal to the master supplicant 3. The master supplicant 3 transfers the received EAP-Response/Identity signal to the authenticator 1. Subsequently, the authenticator 1 carries out authentication processing of slave supplicant 5 through the EAP-Request•Request/SIM/Start processing, and EAP-Request•Response/SIM/Challenge processing. This procedure is identical to that described above, and hence a description thereof is omitted.

When the authentication has been carried out correctly, the authenticator 1 transmits, in step S30, an EAP-Success signal to slave supplicant 5. Further, in step 31, the authenticator 1 transmits an EAP-Success signal to the master supplicant 3 which has transmitted the EAPOL-Start signal thereto on behalf of slave supplicant 5 to notify the supplicant 3 of the completion of the authentication of slave supplicant 5.

[Variation 2 of First Embodiment]

Figure 3:
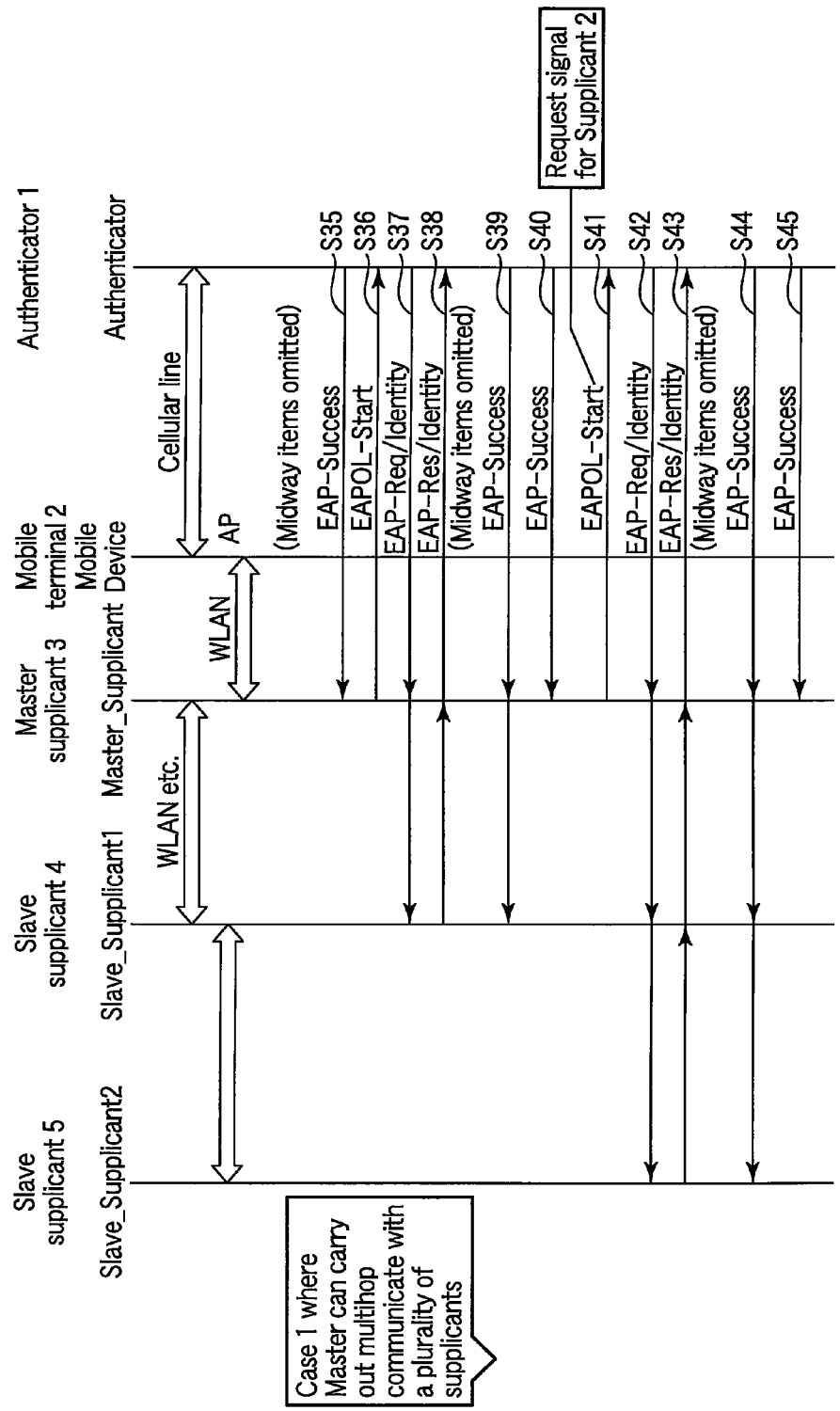
FIG. 3 is an exemplary signal delivery/receipt chart showing a procedure in which three supplicants cooperate with each other to execute an authentication operation together with an authenticator according to the embodiment.

FIG. 3 is an exemplary signal delivery/receipt chart showing a procedure in which three supplicants of the embodiment cooperate with each other to execute an authentication operation together with an authenticator. It should be noted that parts identical to the first embodiment are denoted by reference symbols identical to the first embodiment, and a detailed description of them are omitted.

In the procedure shown in FIG. 3, an authenticator 1, mobile terminal 2, master supplicant 3, slave supplicant 4, and slave supplicant 5 execute signal delivery/receipt. Further, the master supplicant 3 can communicate with slave supplicants 4 and 5 by multihop communication.

Multihop implies a configuration in which a number of supplicants are connected to each other by multistage connection without the intervention of access points. In the multihop communication, supplicants connected to each other and adjacent to each other are configured to be able to communicate with each other, and hence communication is carried out by relay of a plurality of supplicants.

Each of the authentication procedures of the master and slave supplicants 3 and 4 shown in steps S35 to S40 is identical to the processing of steps S21 to S26 shown in FIG. 2, and hence a description thereof is omitted.

Subsequently, an authentication procedure of slave supplicant 5 is executed. When the master supplicant 3 determines that authentication of slave supplicant 5 has not been carried out yet, the supplicant 3 transmits, in step S41, an EAPOL-Start signal for requesting the authenticator 1 to start authentication processing again within a predetermined time after the completion of the authentication of slave supplicant 4 to the authenticator 1.

When the authenticator 1 which has received this signal determines that this signal is the EAPOL-Start signal transmitted thereto on behalf of slave supplicant 5, the authenticator 1 transmits an EAP-Request/Identity signal to the master supplicant 3 in step S42. The master supplicant 3 receives the EAP-Request/Identity signal transmitted from the authenticator 1. The master supplicant 3 transfers the EAP-Request/Identity signal to slave supplicant 4. Slave supplicant 4 receives the EAP-Request/Identity signal transmitted from the master supplicant 3. Slave supplicant 4 transfers the EAP-Request/Identity signal to slave supplicant 5.

Slave supplicant 5 which has received this signal transmits an EAP-Response/Identity signal to slave supplicant 4 in step S43. Slave supplicant 4 which has received this signal transmits the EAP-Response/Identity signal to the master supplicant 3. The master supplicant 3 transfers the received EAP-Response/Identity signal to the authenticator 1.

Thereafter, the master supplicant 3 carries out communication with slave supplicant 5 through slave supplicant 4 in the multihop system to execute the EAP-Request•Response/SIM/Start processing, and EAP-Request•Response/SIM/

Challenge processing. It should be noted that this procedure is identical to that described previously, and hence a description thereof is omitted.

When the authentication has been correctly carried out, the authenticator 1 transmits an EAP-Success signal to the master supplicant 3 in step S44. The master supplicant 3 transmits the EAP-Success signal to slave supplicant 4. Slave supplicant 4 transmits the EAP-success signal to slave supplicant 5. Further, in step 45, the authenticator 1 transmits an EAP-Success signal to the master supplicant 3 which has transmitted the EAPOL-Start signal thereto on behalf of slave supplicant 5 to notify the supplicant 3 of the completion of the authentication of slave supplicant 5.

[Variation 3 of First Embodiment]

Figure 4:
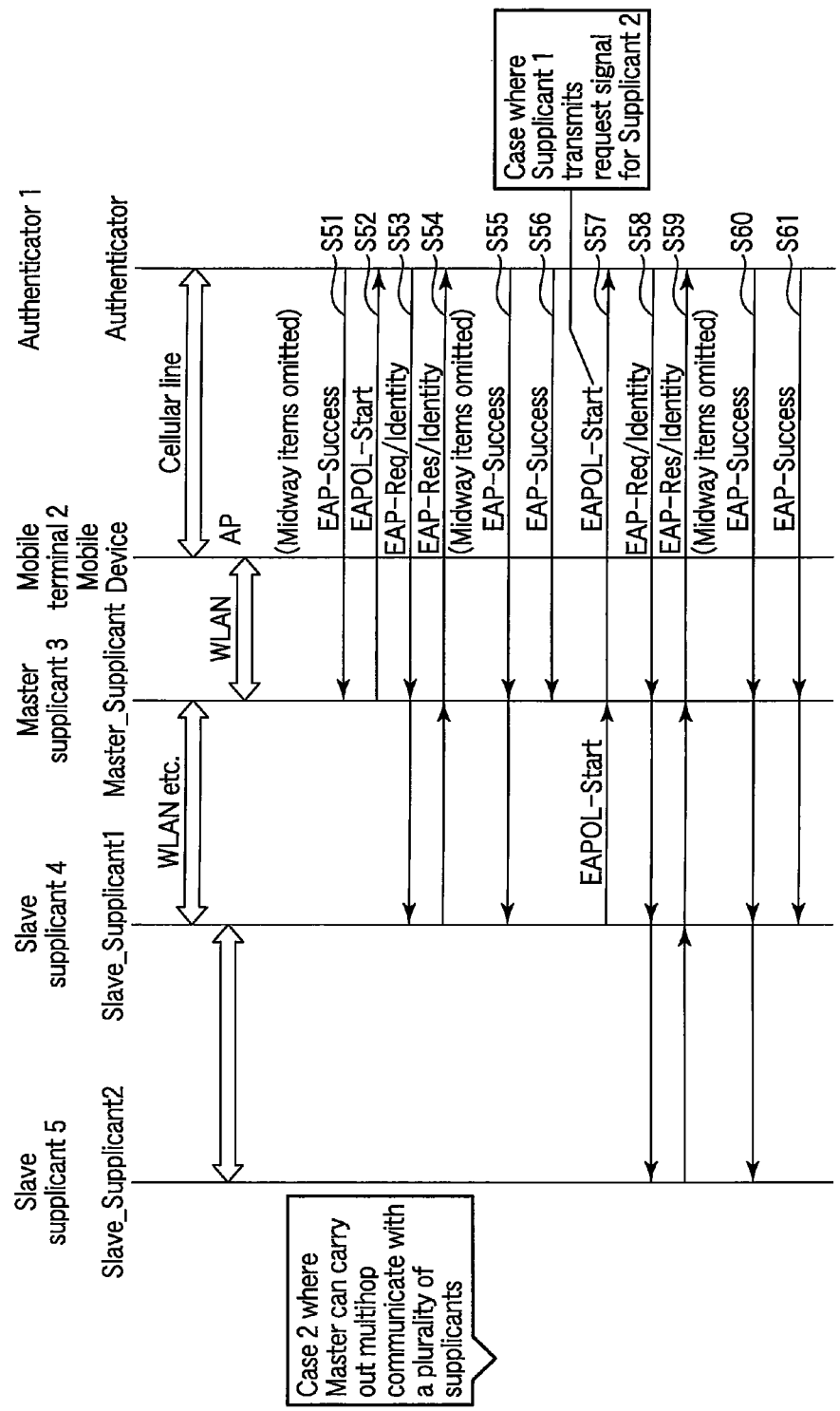
FIG. 4 is an exemplary signal delivery/receipt chart showing a procedure in which three supplicants cooperate with each other to execute an authentication operation together with an authenticator according to the embodiment.

FIG. 4 is an exemplary signal delivery/receipt chart showing a procedure in which three supplicants of the embodiment cooperate with each other to execute an authentication operation together with an authenticator. It should be noted that parts identical to the first embodiment are denoted by reference symbols identical to the first embodiment, and a detailed description of them are omitted.

In the procedure shown in FIG. 4, an authenticator 1, mobile terminal 2, master supplicant 3, slave supplicant 4, and slave supplicant 5 execute signal delivery/receipt. Further, the master supplicant 3 can communicate with slave supplicants 4 and 5 by multihop communication.

Each of the authentication procedures of the master and slave supplicants 3 and 4 shown in steps S51 to S56 is identical to the processing of steps S35 to S40 shown in FIG. 3, and hence a description thereof is omitted.

Subsequently, an authentication procedure of slave supplicant 5 is executed. Slave supplicant 4 transmits, in step S57, an EAPOL-Start signal for requesting the authenticator 1 to start authentication processing within a predetermined time after the completion of authentication of its own device to the master supplicant 3. The master supplicant 3 which has received this signal transmits the EAPOL-Start signal to the authenticator 1.

Thereafter, slave supplicant 4 carries out multihop communication with the master supplicant 3 and slave supplicant 5 to execute the EAP-Request•Response/Identity processing, EAP-Request•Response/SIM/Start processing, and EAP-Request•Response/SIM/Challenge processing. It should be noted that this procedure is identical to that of steps S42 to S44 of FIG. 3, and hence a description thereof is omitted.

Further, in step S61, the authenticator 1 transmits an EAP-Success signal to the master supplicant 3 to notify the supplicant 3 of the completion of the authentication of slave supplicant 5. The master supplicant 3 transmits the EAP-Success signal to the slave supplicant 4.

FIG. 5 is an exemplary view for explaining an example in which the authentication system of the embodiment is applied to power supply service for an electric vehicle.

In a power supply station 10 of FIG. 5, a wall outlet 13, and circuit breaker 14 are provided, and electric power supplied from an electric power company through an electric power transmission line can be supplied to an electric vehicle 16. On the other hand, a user who is an owner of the electric vehicle 16 carries a cellular phone 12 for payment of a charged amount. The cellular phone 12 can communicate with an authenticator 11 through a communication network 15.

When the devices shown in FIG. 5 and devices which have executed the authentication procedure described above are compared with each other, the mobile terminal 2 corresponds to the cellular phone, master supplicant 3 corresponds to the wall outlet 13 that can supply power to the electric vehicle 16, and slave supplicant 4 corresponds to the circuit breaker 14 connected to the wall outlet 13.

The electric power company measures the total amount of electric power used at the circuit breaker 14, thereby carrying out accounting. In this system, even when a person other than a contractor of the circuit breaker 14 supplies power by using the wall outlet 13, an electric bill is collected from the contractor of the circuit breaker. However, when the actual operation is taken into consideration, a case where a person other than the contractor uses the electric power by using the wall outlet is conceivable. Accordingly, a system in which a user who uses the electric power should pay the electric bill is necessary.

As a method of solving this problem, application of the aforementioned authentication method is conceivable.

The wall outlet 13 which is the master supplicant 3 is provided with a meter configured to measure the supply amount of electric power. The user brings the cellular phone 12 close to the wall outlet 13, whereby the master supplicant 3 and cellular phone 12 carry out communication with each other. When a credit function is added to the cellular phone in advance, the credit data can be retained in the circuit breaker 14 which is the slave supplicant 4 through the wall outlet 13 which is the master supplicant 3. It becomes possible for the electric power supplier to charge the user for used electric power on the basis of the credit data and used amount of electric power obtained from the meter.

However, concerning the user of the cellular phone 12, notifying the master supplicant 3 and slave supplicant 4 of the credit data without recognizing that the supplicants 3 and 4 are valid devices is problematic in terms of security. Thus, taking the opportunity of the communication between the cellular phone 12 and master supplicant 3, an authenticator possessed by the communication common carrier is used to authenticate the master supplicant 3 and slave supplicant 4, whereby it becomes possible for the user to inform the supplicants of the credit data without anxiety.

Further, the data is encrypted by the SIM, and hence even when the credit data retained by the slave supplicant 4 is illegally acquired by a third party, the data cannot be inspected.

By using the technique of authenticating a plurality of devices by cooperation between the devices in the manner described above, it becomes possible to construct a system in which a user of electric power is charged in a service of supplying electric power to electric vehicles 16. It should be noted that the electric power supplying service is only one of application examples of the present invention, and the present invention can be applied to various services without being limited to the above example.

It should be noted that in the example shown in FIG. 5, although the function of the master supplicant 3 is allocated to the wall outlet 13, the allocation is not limited to the example, and the circuit breaker 14 may be allocated to the master supplicant 3.

In general, when a plurality of data devices are present, a device corresponding to the master supplicant 3 may be determined in advance. Further, a data device firstly accessed by the mobile terminal 2 may bear the function of the master supplicant 3 without previously determining a device corresponding to the master supplicant 3.

Second Embodiment

In the first embodiment, authentication has been executed serially in such a manner that after completion of the authentication processing of the master supplicant 3, the authentication processing of the slave supplicant 4 is executed. Conversely, in a second embodiment, authentication of a master supplicant 3, and authentication of a slave supplicant 4 are simultaneously carried out, whereby the communication efficiency in authentication is improved. Accordingly, parts identical to the first embodiment are denoted by reference symbols identical to the first embodiment, and a detailed description of them are omitted.

Figure 6:
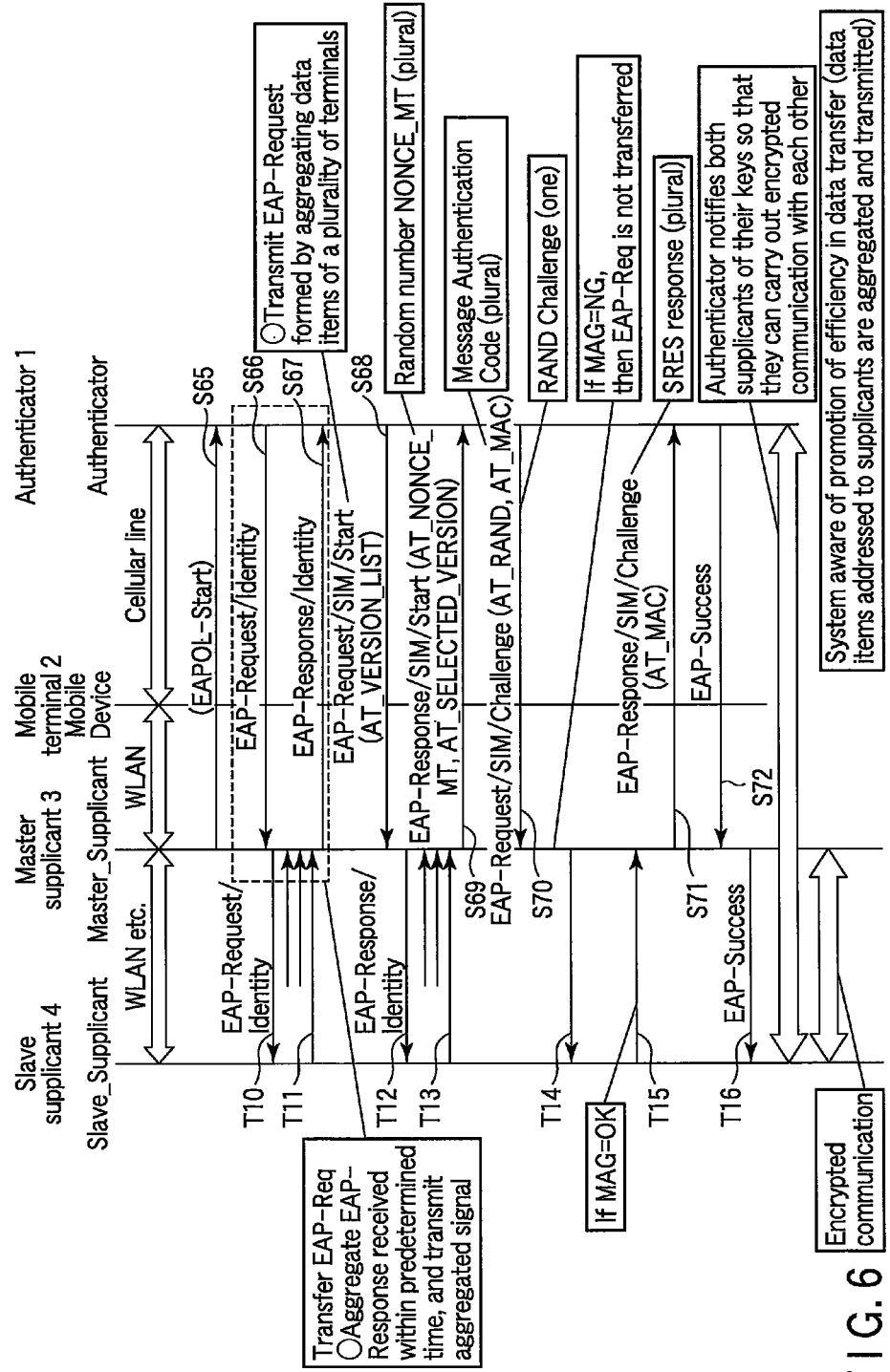
FIG. 6 is an exemplary signal delivery/receipt chart showing a procedure in which two supplicants cooperate with each other to execute an authentication operation together with an authenticator according to a second embodiment.

FIG. 6 is an exemplary signal delivery/receipt chart showing a procedure in which two supplicants of the second embodiment cooperate with each other to execute an authentication operation together with an authenticator. It should be noted that the present invention is not limited to the case where the number of supplicants is two, and can be applied to a case where the number of supplicants is three or more.

In step S65, when the master supplicant 3 has established communication with a mobile terminal 2, the master supplicant 3 transmits an EAPOL-Start signal to an authenticator 1. In step S66, the authenticator which has received this signal transmits an EAP-Request/Identity signal to the master supplicant 3. In step T10, when the master supplicant 3 has received the EAP-Request/Identity signal, the master supplicant 3 transfers the signal to the slave supplicant 4.

The master supplicant 3 stands by for a predetermined time. When the master supplicant has received the EAP-Response/Identity signal transmitted from the slave supplicant 4 within the predetermined time in step T11, the master supplicant 3 generates one EAP-Response/Identity signal formed by aggregating the EAP-Response/Identity signal of its own device, and EAP-Response/Identity signal of the slave supplicant 4 with each other, and transmits the generated signal to the authenticator 1.

As described above, the number of the supplicants is not limited to two, and hence EAP-Response/Identity signals transmitted from two or more slave supplicants 4 are received in some cases. In such a case, one EAP-Response/Identity signal formed by aggregating two or more EAP-Response/Identity signals received within a predetermined time, and the EAP-Response/Identity signal of the master supplicant 3 with each other is generated, and is transmitted to the authenticator 1.

It should be noted that as the method of aggregating a plurality of EAP-Response/Identity signals with each other and aggregating into one EAP-Response/Identity signal, the method provided in, for example, IEEE 802. 11n can be employed. The authenticator 1 which has received the aggregated EAP-Response/Identity signal transmits, in step S68, EAP-Request/SIM/Start data formed by aggregating a plurality of EAP-Request/SIM/Start data items with each other in accordance with the number of aggregation to the master supplicant 3.

The master supplicant 3 which has received this data extracts an EAP-Request/SIM/Start data item corresponding to its own device from the data transmitted thereto, and transfers the received EAP-Request/SIM/Start data to the slave supplicant 4. Further, after the transfer of the data to the slave supplicant 4, the master supplicant 3 starts a timer or the like to wait for receipt of a response signal.

It should be noted that as the transfer method, the master supplicant 3 may transfer the received EAP-Request/SIM/Start data to the slave supplicant 4 as it is, or may aggregate a plurality of EAP-Request/SIM/Start data items with each other, and may transmit the aggregated EAP-Request/SIM/Start data separately to each of a plurality of slave supplicants 4. Each of the slave supplicants 4 extracts an EAP-Request/SIM/Start data item for its own device from the received data not in accordance with the format of an EAP-Request/SIM/Start signal, and transmits an EAP-Response/SIM/Start signal as a response signal of the received data.

In step T13, when the master supplicant 3 has received EAP-Response/Identity signals transmitted from the slave supplicants 4 within a predetermined time, the master supplicant 3 aggregates EAP-Response/SIM/Start signals from the slave supplicants 4 received before a time-out occurs, and transfers the aggregated signal to the authenticator 1. At this time, random numbers NONCE_MT which are one of the EAP-Response/SIM/Start data items differ from one another in each of the slave supplicants 4.

The authenticator 1 which has received this signal transmits an aggregated EAP-Request/SIM/Challenge signal to the master supplicant 3 in step S70. Here, a Message Authentication Code (MAC) which is a data element of the EAP-Request/SIM/Challenge signal is generated for each NONCE_MT, and hence differs from each other in each of the slave supplicants 4. Further, the random numbers RAND Challenge which are data elements are data issued from the authenticator 1, and hence are common values.

The master supplicant 3 which has received the EAP-Request/SIM/Challenge signal confirms a Message Authentication Code associated with its own device and, when the supplicant 3 determines that the MAC associated with its own device is not appropriate, the supplicant 3 does not transfer the EAP-Request/SIM/Challenge signal to the slave supplicants 4. On the other hand, when it is determined by the master supplicant 3 that the MAC associated with its own device is appropriate, the supplicant 3 transfers the EAP-Request/SIM/Challenge signal to the slave supplicants 4 in step T14. Further, after the transfer of the above signal, the master supplicant 3 starts a timer or the like to wait for receipt of a response signal.

The slave supplicant 4 which has received the EAP-Request/SIM/Challenge signal confirms a Message Authentication Code corresponding to its own device and, when the supplicant 4 determines that the MAC corresponding to its own device is appropriate, the supplicant 4 transmits an EAP-Response/SIM/Challenge signal to the master supplicant 3 in step T15. In step S71, the master supplicant 3 aggregates the EAP-Response/SIM/Challenge signals received before a time-out occurs, and transmits the aggregated signal to the authenticator 1.

Further, in step S72, the authenticator 1 transmits an aggregated EAP-Success signal to one of the master and slave supplicants 3 and 4, one of the supplicants being successful in the authentication processing.

It should be noted that like in the case of the first embodiment, the authenticator 1 may notify the supplicants of their encryption keys so that the supplicants for each of which authentication has been completed can carry out encrypted communication with each other.

Third Embodiment

A third embodiment differs from the second embodiment in using common data to authenticate each supplicant in order to further improve efficiency.

Figure 7:
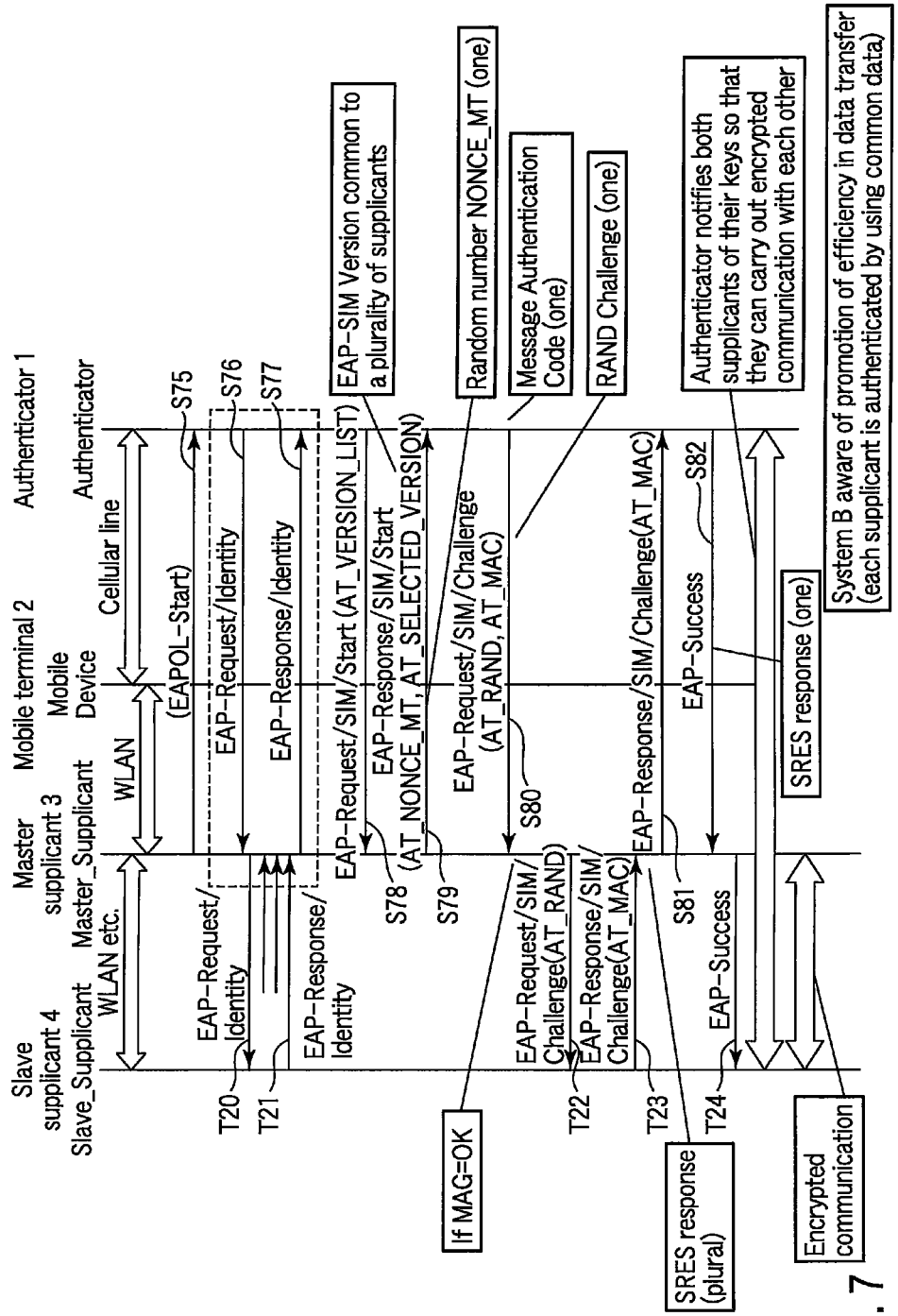
FIG. 7 is an exemplary signal delivery/receipt chart showing a procedure in which two supplicants cooperate with each other to execute an authentication operation together with an authenticator according to a third embodiment.

FIG. 7 is an exemplary signal delivery/receipt chart showing a procedure in which two supplicants of the third embodiment cooperate with each other to execute an authentication operation together with an authenticator. It should be noted that the present invention is not limited to the case where the number of supplicants is two, and can be applied to a case where the number of supplicants is three or more.

Steps S75 to S77, and T20 to T21 are identical to steps S65 to S67, and T10 to T11 of FIG. 6, and hence a detailed description of them is omitted.

An authenticator 1 which has received an aggregated EAP-Response/Identity signal transmits, in step S78, EAP-Request/SIM/Start data formed by aggregating a plurality of EAP-Request/SIM/Start data items with each other in accordance with the number of aggregation to a master supplicant 3.

The master supplicant 3 which has received the EAP-Request/SIM/Start signal transmits an EAP-Response/SIM/Start signal to the authenticator 1 in step S79 without transferring the received signal to a slave supplicant 4.

However, EAP-SIM version which is data to be added to the EAP-Response/SIM/Start signal is common to all the related slave supplicants 4. Further, each of NONCE_MT, and AT_SELECTED_VERSION which are parameters of the EAP-Response/SIM/Start signal, is used in common, and is one.

The authenticator 1 which has received this signal generates a common Message Authentication Code from the common NONCE_MT and transmits, in step S80, an EAP-Request/SIM/Challenge signal to which the MAC and one Challenge are added, to the master supplicant 3.

The master supplicant 3 checks the Message Authentication Code transmitted thereto. Further, when the master supplicant 3 determines that the MAC is not appropriate, the supplicant 3 does not transfer the EAP-Request/SIM/Challenge signal to the slave supplicant 4. On the other hand, when it is determined by the master supplicant 3 that the MAC is appropriate, the supplicant 3 transfers the EAP-Request/SIM/Challenge signal to the slave supplicant 4 in step T22.

Each slave supplicant 4 which has received this signal accepts the authentication result obtained by the master supplicant 3 to determine that the Message Authentication Code is appropriate, and returns an EAP-Response/SIM/challenge signal to which SRES response and AT_MAC generated on the basis of RAND are added to the master supplicant 3 in step T23. The master supplicant 3 aggregates return signals from the slave supplicants 4 into one EAP-Response/SIM/Challenge signal, and transmits the aggregated signal to the authenticator 1 in step S81.

The authenticator 1 carries out authentication processing for each supplicant and, when the authenticator 1 determines that all the supplicants are valid supplicants, the authenticator 1 transmits an EAP-Success signal to the master supplicant 3 in step S82. One SRES response data item indicating success common to all the master and slave supplicants is added to the EAP-Success signal. The master supplicant 3 which has received this signal transfers the EAP-Success signal received for each of all the slave supplicants 4 to each of all the slave supplicants 4 in step T24.

Further, like in the cases of the first and second embodiments, the authenticator 1 may notify the supplicants of their encryption keys so that the supplicants for each of which authentication has been completed can carry out encrypted communication with each other.

As described above, in step S79, the master supplicant 3 transmits the signal to which one NONCE_MT is added, to the authenticator 1 as a representative of the other supplicants and, in step S80, the authenticator 1 transmits the signal to which one MAC is added, to the master supplicant 3. When the master supplicant 3 determines that the MAC is appropriate, the supplicant 3 transfers the signal to the slave supplicant 4. At this time, the master supplicant 3 has already determined that the authenticator 1 is a valid authenticator, and hence the slave supplicant 4 may not determine the validity of the authenticator 1 again.

As described above, in the third embodiment, common data is used to carry out authentication, whereby it is possible to further improve the communication efficiency in authentication.

It should be noted that the slave supplicant 4 may determine the validity of the authenticator 1 again. For example, in step T22, when the master supplicant 3 determines that the MAC is appropriate, the supplicant 3 transfers the signal to the slave supplicant 4. At this time, the signal to which NONCE_MT transmitted from the master supplicant's own device to the authenticator 1 as a parameter, and MAC are added is transferred. The slave supplicant 4 determines the validity of the authenticator 1 by using the data of the NONCE_MT and MAC.

According to the embodiments described above, it is possible to authenticate a plurality of devices by cooperation of the devices, and hence when authentication is carried out with respect to a system constituted of a plurality of devices, it is possible to obtain an efficient and effective authentication operation.

It should be noted that in each of the embodiments described above, although the mobile terminal 2 is provided between the master supplicant 3 and authenticator 1, and is provided with a function of carrying out communication through the cellular line which is a first network, and WLAN which is a second network, the master supplicant 3 may be provided with a function of carrying out communication through the first network and second network without providing the mobile terminal 2.

It should be noted that the communication station described in each of the above-mentioned embodiments can generally be ascertained and configured as an electronic device provided with a communication function. However, this communication function is not limited to that constituted of hardware such as a communication circuit or the like. For example, part of the communication function described in each of the embodiments described above can also be constituted of software. Software can run on a CPU incorporated in a communication circuit, and can also run on a CPU incorporated in an electronic device connected to a communication circuit. Further, the communication circuit can be incorporated in a medium detachable from the electronic device. That is, the present invention is not to limit how to configure an electronic device provided with a communication function. Accordingly, it is also possible to store part of the functions described in each of the embodiments in a medium such as a SIM card, SD card or the like. Further, it is also possible to configure the above part of functions as an IC chip. Furthermore, it is also possible to realize the above part of functions by appropriately selecting and combining hardware, software, recording medium, SIM card, SD card, and IC chip.

It should be noted that the functions described in each of the embodiments not only can be configured by using hardware, but also can be realized by causing a computer to read a program in which the above functions are described by using software. Further, the functions may be configured by appropriately selecting one of software and hardware.

It should be noted that the present invention is not limited to the aforementioned embodiments as they are and, in the implementation stage, the constituent elements can be modified and embodied within a scope not deviating from the essence of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device communicatively coupled to an authentication device through a first communication network and communicatively coupled to a slave electronic device through a second communication network, the electronic device comprising:
   an authentication processor configured to perform authentication of the electronic device by transmission/reception data conforming to a predetermined authentication procedure between the electronic device and the authentication device through the first communication network;
   an authentication start processor which, when the electronic device has been authenticated by the authentication device, is configured to transmit an authentication start signal to start authentication of the slave electronic device through the first communication network;
   an authentication request transfer processor which, when an authentication request signal is received from the authentication device, is configured to determine whether or not the authentication request signal is an authentication request associated with the electronic device and, when it is determined that the authentication request signal is not an authentication request associated with the electronic device, is configured to transfer the authentication request signal to the slave electronic device through the second communication network; and
   a data relay processor configured to relay the transmission/reception data in conformity with the predetermined authentication procedure between the authentication device and the slave electronic device,
   wherein data indicating that the authentication start signal is transmitted on behalf of the slave electronic device is included in the authentication start signal.

2. The electronic device according to claim 1, wherein a plurality of other electronic devices are connected to the second communication network, and
   the electronic device further comprises execution control processor configured to cause each of a transmission operation of the authentication start signal to start authentication of the plurality of other electronic devices to be executed by the authentication start processor, a transfer operation of an authentication request signal to be executed by the authentication request transfer processor, and a relay operation of the transmission/reception data to be executed by the data relay processor, to be executed for each of the plurality of electronic devices.

3. The electronic device according to claim 2, wherein data indicating that the authentication start signal is transmitted on behalf of one of the plurality of other electronic devices is included in the authentication start signal.

4. The electronic device according to claim 2, wherein the plurality of other electronic devices are communicatively coupled to each other, and the electronic device carries out transmission/reception data with the plurality of other electronic devices through at least one of the other plurality electronic devices serving as a relay point.

5. The electronic device according to claim 4, wherein data indicating that the authentication start signal is transmitted on behalf of one of the plurality of other electronic devices is included in the authentication start signal.

6. An electronic device communicatively coupled to an authentication device through a first communication network and communicatively coupled to a plurality of other electronic devices through a second communication network, the electronic device comprising:
   an authentication start processor configured to transmit an authentication start signal to start authentication of the electronic device and the other plurality of electronic devices through the first communication network;
   an authentication request transfer processor which, when an authentication request signal is received from the authentication device, is configured to transfer the authentication request signal to the plurality of other electronic devices through the second communication network;
   an authentication transmission/reception data processor configured to, regarding transmission/reception of data for authentication between the authentication device and the plurality of other electronic devices, aggregate data associated with the electronic device and data items received from the plurality of other electronic devices with each other, transmit the aggregated data to the authentication device, and transmit data from the authentication device to each of the plurality of other electronic devices; and
   an execution control processor configured to cause each of a transmission operation of an authentication start signal to start authentication of the plurality of the other electronic devices connected to the second communication network to be executed by the authentication start processor, a transfer operation of an authentication request signal to be executed by the authentication request transfer processor, and a relay operation of the transmission/reception data to be executed by a data relay processor, to be executed for each of the plurality of electronic devices.

7. The electronic device according to claim 6, wherein the authentication transmission/reception data processor includes:
   a random number data transmission processor configured to transmit a plurality of random number data items generated in each of the electronic devices, and the plurality of other electronic devices to the authentication device,
   an authentication data receipt processor configured to receive a signal including a plurality of authentication data items generated by the authentication device in a manner that the authentication data items correspond to the plurality of random number data items, and
   a transmission inhibition processor configured to, when the authentication data corresponding to the random number data generated in the electronic device is not valid, inhibit the signal including the plurality of authentication data items transmitted from the authentication device from being transmitted to the plurality of other electronic devices.

8. The electronic device according to claim 6, wherein the authentication transmission/reception processor includes:

a random number data transmission processor configured to transmit one random number data item generated in the electronic device to the authentication device, an authentication data receipt processor configured to receive one authentication data item generated in the authentication device in a manner that the authentication data item corresponds to the one random number data item, and a transmission inhibition processor configured to, when the authentication data corresponding to the random number data generated in the electronic device is not valid, inhibit the signal transmitted from the authentication device from being transmitted to the plurality of other electronic devices.

9. A terminal communicatively coupled to an authentication device through a first communication network and further communicatively coupled, through a second communication network, to an electronic device that is communicatively coupled to a slave electronic device through a third communication network, and configured to relay transmission/reception data between the authentication device and the electronic device, wherein the electronic device comprises:
an electronic device authentication processor configured to perform authentication of the electronic device by transmission/reception data conforming to a predetermined authentication procedure between the electronic device authentication processor and the authentication device through the first communication network;

an authentication start processor which, when the electronic device has been authenticated by the authentication device, is configured to transmit an authentication start signal configured to start authentication of the slave electronic device through the first communication network;

an authentication request transfer processor which, when an authentication request signal is received from the authentication device, is configured to determine whether or not the authentication request signal is an authentication request associated with the electronic device and, when it is determined that the authentication request signal is not an authentication request associated with the electronic device, is configured to transfer the authentication request signal to the slave electronic device through the second communication network; and a data relay processor configured to relay delivered/received data in conformity with the predetermined authentication procedure between the authentication device and the slave electronic device, and the authentication device comprises:
a first authentication device authentication processor configured to perform authentication of the electronic device by transmission/reception data conforming to a predetermined authentication procedure between the first authentication device authentication processor and the electronic device through the first communication network;

a determination processor which, when an authentication start signal is received from the electronic device after the electronic device has been authenticated, is configured to determine whether or not authentication of the slave electronic device is to be started;

an authentication request processor which, when it is determined that authentication of the slave electronic device is to be started, is configured to transmit an authentication request signal associated with the slave electronic device to the electronic device; and a second authentication device authentication processor configured to perform transmission/reception data conforming to the predetermined authentication procedure between the second authentication device authentication processor and the electronic device to authenticate the slave electronic device.

10. A terminal communicatively coupled to an authentication device through a first communication network and further communicatively coupled, through a second communication network, to an electronic device that is communicatively coupled to a plurality of other electronic devices through a third communication network, and configured to relay transmission/reception data between the authentication device and the electronic device, wherein the electronic device comprises:
an authentication start processor configured to transmit an authentication start signal configured to start authentication of the electronic device and the plurality other electronic devices through the first communication network;

an authentication request transfer processor which, when an authentication request signal is received from the authentication device, is configured to transfer the authentication request signal to the plurality of other electronic devices through the second communication network; and an authentication transmission/reception data processor configured to, regarding transmission/reception of data for authentication between the authentication device and the plurality of other electronic devices, aggregate data associated with the electronic device and data items received from the plurality of other electronic devices with each other, to transmit the aggregated data to the authentication device, and transmit data from the authentication device to each of the plurality of other electronic devices, the authentication device comprises:
an authentication start signal receipt processor configured to receive an authentication start signal configured to start authentication of the electronic device and the plurality of other electronic devices through the first communication network;

an authentication request signal transmission processor configured to transmit an authentication request signal to the electronic device; and an authentication processor configured to execute transmission/reception of data configured to authenticate the electronic device and the plurality of other electronic devices between the authentication processor and the electronic device, and the data for authentication being data formed by aggregating data associated with the electronic device and data items associated with the plurality of other electronic devices with each other.

* * * * *